Sept. 2, 1969  F. COLLURA  3,464,402
SOLAR HEAT EXCHANGER CONSTRUCTION
Filed Sept. 21, 1967
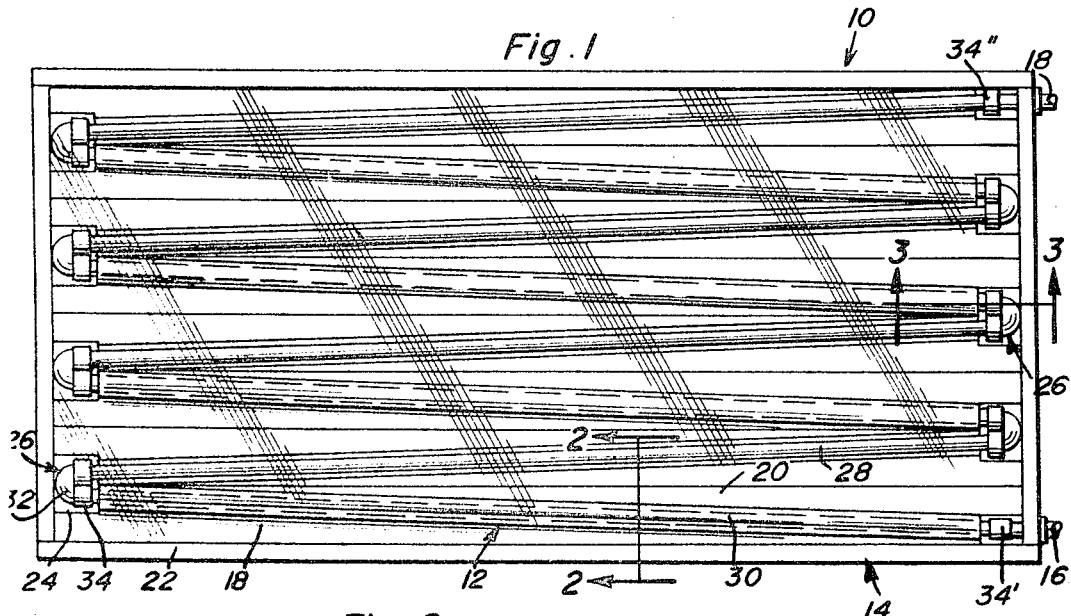
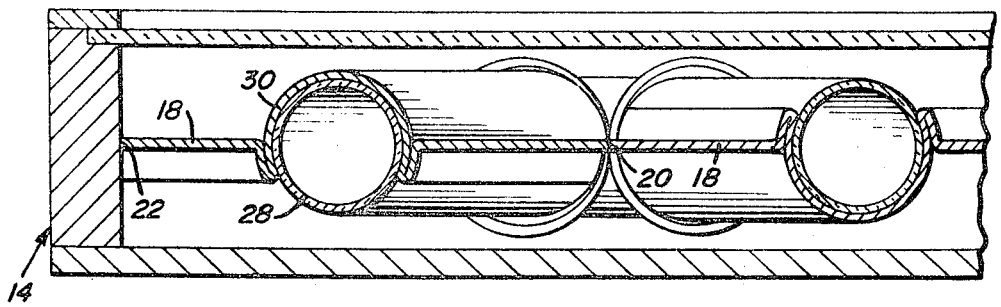
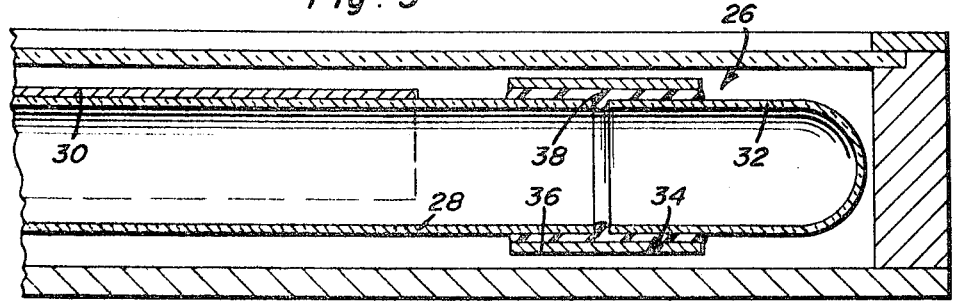
Frank Collura
INVENTOR.

United States Patent Office 3,464,402
Patented Sept. 2, 1969

3,464,402
SOLAR HEAT EXCHANGER CONSTRUCTION
Frank Collura, 2121 Erna Drive, Tampa, Fla. 33603
Filed Sept. 21, 1967, Ser. No. 669,596
Int. Cl. F24j 3/02; F28f 1/32
U.S. Cl. 126—271
10 Claims

ABSTRACT OF THE DISCLOSURE

A solar heater assembly formed from a plurality of horizontal, abutting panels made of aluminum having inclined grooves receiving straight tube sections made from discarded fluorescent tubes with the terminal ends cut off. The grooves in adjacent panels open from opposite sides of the panel assembly and the tube sections are interconnected at opposite recessed ends of the panels by U-shaped couplings.

---

This invention relates to a new and useful solar heating assembly and more particularly to a low pressure type of solar energy collector.

Greater attention is presently being paid to the conversion of solar energy into more useful forms of energy because of the air pollution problem created by combustion of fossil fuels such as coal, oil and gas. The major problem in converting solar energy into other forms of energy, resides in the collection of the solar energy. Although solar collectors have been proposed and have been in limited use for some time, the cost of fabrication and repair or replacement of parts has been one of the factors discouraging widespread acceptance.

Many solar collectors feature water conducting tubes made of a metallic, heat conducting material. Such solar collectors are relatively expensive because of the materials utilized which is quite a problem because such solar collectors being exposed to sunlight are readily susceptible to damage.

In accordance with the present invention, a solar collector of the type employing fluid conducting tubes exposed to sunlight, is arranged to operate under a relatively low pressure so that less expensive materials may be utilized in the construction of both the fluid conducting tubes and the heat conductive backing mounted thereon. More particularly, the solar collector of the present invention utilizes straight tube sections made of glass received within groove formations formed in metallic backing panels. The panels are accordingly assembled in abutting relation to each other to form a panel assembly of any desired extent. Each panel may be machine formed and a glass tube clipped into its groove formation to eliminate the cost of soldering the tube to the backing plate. Further, the cost of the collector is substantially reduced by utilizing discarded fluorescent lamp tubes with the terminal ends thereof cut off as the glass tube sections for conducting water through the solar collector. It has been found that the combination of these thin-walled glass tubes and aluminum backing panels have heat absorbing characteristics almost as good as copper tubing.

Inasmuch as a solar heating assembly constructed in accordance with the present invention is made from separate backing panels each having a single glass tube associated therewith, any stresses developed in the panel assembly will be localized so as to minimize tube breakage and deterioration and also prevent reduction in surface contact between the panel and the tubes as a result of stress concentration. Also, repair of a damaged solar heating assembly will be less costly since only broken panel sections need be removed and replaced.

Stress concentration and damage to the solar heating assembly constructed in accordance with the present invention is furthermore minimized by interconnecting the ends of the straight tube sections with expansion coupling joints, and reception of the tube sections in grooves of adjacent panels that open from opposite sides of the panel assembly. The expansion joints act as both shock absorbers and self-aligners to protect the glass tubes. This is particularly significant because of the use of thin-walled fluorescent lamp tubes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view of a typical solar heating assembly constructed in accordance with the present invention.

FIGURE 2 is an enlarged sectional view taken substantially through a plane indicated by section line 2—2 in FIGURE 1.

FIGURE 3 is an enlarged partial sectional view taken substantially through a plane indicated by section line 3—3 in FIGURE 1.

FIGURE 4 is a perspective view showing a discarded fluorescent lamp tube with the ends thereof cut off in order to form one of the straight tube sections associated with the solar heating assembly.

Referring now to the drawings in detail, a typical solar heating assembly generally referred to by reference numeral 10 is shown in FIGURE 1 consisting of a plurality of interconnected panel sections 12 enclosed within a suitable frame 14 mounted in a suitable location exposed to the rays of the sun. Water under a low pressure is supplied at a lower end of the assembly 10 through an inlet conduit 16 for thermal-syphon circulation through the assembly from which it is conducted by the outlet conduit 17. Thus, upward flow of water under the low pressure will be enhanced by heating thereof. In lieu of water, air could be conducted through the assembly. A plurality of such solar collecting assemblies 10 could be interconnected with a storage tank from which the heated fluid would be pumped to a higher pressure. Each panel section 12 is similar in construction and is made of a sheet metal backing plate 18 having vertically spaced, parallel edges 20 and 22 along which adjacent panel plates abut. Each of the longitudinal edges is formed with a recess 24 at an opposite end of the plate, the recesses thus facing opposite directions at the opposite ends of the plate. The abutting plates are arranged so that the recesses 24 at adjacent ends enclose couplings 26 between adjacent ends of a plurality of straight, water conducting tube sections 28.

Each plate 18 is provided with a groove formation 30 within which one of the straight tube sections 28 is seated. The groove formation 30 is inclined relative to the spaced longitudinal edges 20 and 22 and extends between the recesses 24 at the opposite ends of the plate. The ends of the straight tube section 28 seated in the groove formation project into the recesses 24 so that they may be coupled to the adjacent ends of other tube sections by means of the couplings 26. Also, as more clearly seen in FIGURE 2, the groove formations 30 in abutting plates open from opposite sides of the assembly. However, since the cross-sectional center of curvatures of the groove formations are aligned in a common plane, the tube sections 28 will also be aligned even though they are seated on opposite sides of the panel assembly. Further, it will be noted from FIGURE 2 that the tubes are embraced by the groove formations for more than 180° in cross-section so as to establish a greater contact surface between the tube sections and the backing plates as well as to yieldably but firmly hold the glass tubes in position.

Each of the couplings 26 as shown in FIGURES 1 and 3, includes a U-shaped, tubular connector 32 connected to the adjacent ends of tube sections 28 by means of expansion joints 34. Each expansion joint includes an outer, rigid, coupling collar 36 enclosing a silicone, rubber adhesive sealant 38. The expansion joints act as shock absorbers and self-aligners for the tube sections. Expansion joints 34' and 34" similar to the expansion joints 34 also join the lowermost tube section and the uppermost tube section to the inlet conduit 16 and outlet conduit 18 respectively.

The backing plates 18 are made of a heat conductive metal such as aluminum with the recesses 24 and the groove formations 30 formed therein to respectively accommodate the couplings 26 and seat the straight tube sections 28 as aforementioned. Thus, soldering of the water conducting tube sections to the backing plate is eliminated. Furthermore, the tube sections being made of glass may be derived from discharged fluorescent tubes as shown in FIGURE 4 wherein the terminal ends 40 of the lamp tubes are cut off. Thus, a substantial reduction in cost will be realized in the fabrication of the solar heating assembly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a solar heater, a heat conductive panel, a plurality of straight tube sections, tube holding means releasably holding the tube sections on opposite sides of said backing panel for support thereof, and a plurality of expansion couplings connecting adjacent ends of said tube sections on the opposite sides of the backing panel.

2. The combination of claim 1 wherein said tube sections are discarded fluorescent tubes having the terminal end portions thereof cut off.

3. The combination of claim 1 wherein said expansion couplings include silicone sealant joints.

4. The combination of claim 1 wherein said tube holding means comprises elongated integral projections of the backing panel cross-sectionally embracing said tubes to hold the same in alignment with a common plane extending through the panel.

5. In a solar heater, heat conductive backing means, a plurality of straight tube sections received on opposite sides of said backing means for support thereof, and a plurality of expansion couplings connecting adjacent ends of said tube sections on the opposite sides of the backing means, said backing means comprising a plurality of separate panels abutting each other, each of said panels having opposite, recessed end portions and a groove formation extending therebetween receiving one of the tube sections, said expansion couplings being disposed in the recessed end portions of abutting panels.

6. The combination of claim 5 wherein said tube sections are circular in cross-section and made of glass.

7. The combination of claim 6 wherein the groove formations in abutting panels open from opposite sides of the backing means to receive the tube sections substantially aligned in a common plane.

8. The combination of claim 5 wherein the groove formations in abutting panels open from opposite sides of the backing means to receive the tube sections substantially aligned in a common plane.

9. In a solar heater, a metallic panel having parallel spaced, longitudinal edges and opposite ends, each of the spaced longitudinal edges having a recess at an opposite one of the ends, a groove formation extending at an angle to said edges between the recesses at the opposite ends of the panel and a glass tube received in the groove formation and projecting into said recesses.

10. The combination of claim 9 wherein said groove formation is arcuate in cross-section having a center of curvature substantially lying in the plane of the panel and cross-sectionally embracing more than half the tube.

References Cited

UNITED STATES PATENTS

| | | | |
|---|---|---|---|
| 1,125,113 | 1/1915 | Junkers | 165—171 |
| 1,425,174 | 8/1922 | Cartter et al. | 126—271 |
| 2,257,524 | 9/1941 | De Bogory | 126—271 |
| 2,608,968 | 9/1952 | Moseley | 126—271 |
| 2,907,318 | 10/1959 | Awot | 126—271 |
| 3,039,453 | 6/1962 | Andrassy | 126—271 |

CHARLES J. MYHRE, Primary Examiner

U.S. Cl. X.R.

165—171